INVENTOR.
Floyd G. Kerby
BY
Wm. R. Glisson
ATTORNEY

Dec. 1, 1964  F. G. KERBY  3,159,419
DIE-FORMED SHEET METAL STRUCTURES AND
METHOD OF MAKING THE SAME
Filed Oct. 30, 1961  2 Sheets-Sheet 2
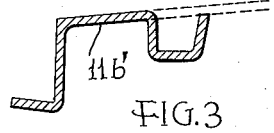
FIG.3
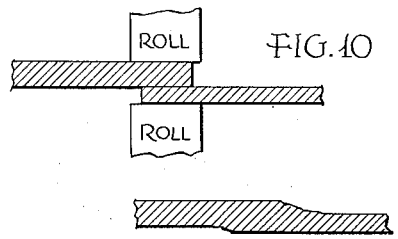
FIG.10
FIG.11
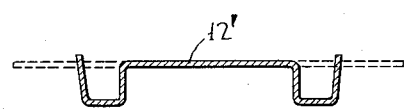
FIG.4
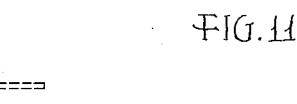
FIG.5
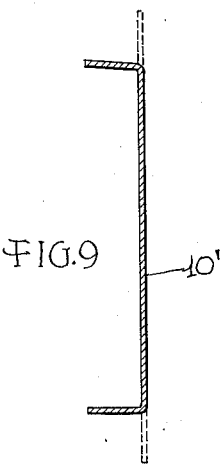
FIG.9
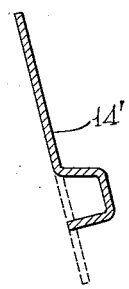
FIG.8
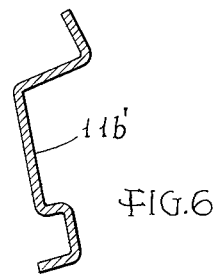
FIG.6
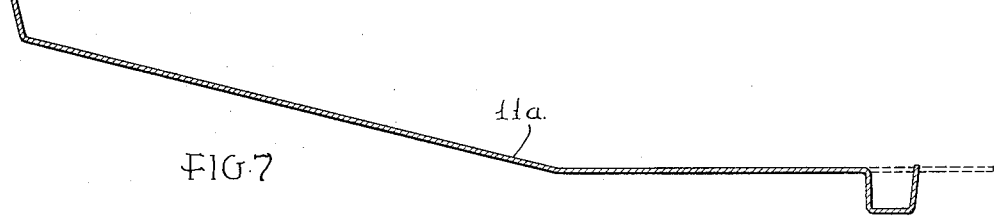
FIG.7
INVENTOR.
Floyd G. Kerby
BY
Wm. R. Glisson
ATTORNEY

United States Patent Office 3,159,419
Patented Dec. 1, 1964

3,159,419
DIE-FORMED SHEET METAL STRUCTURES AND
METHOD OF MAKING THE SAME
Floyd G. Kerby, Grosse Pointe Woods, Mich., assignor to The Budd Company, Philadelphia, Pa., a corporation of Pennsylvania
Filed Oct. 30, 1961, Ser. No. 148,502
13 Claims. (Cl. 296—28)

This application is a continuation-in-part of my copending application, Serial Number 63,803, filed October 20, 1960, and now abandoned, for "Die-Formed Sheet Metal Structures and Method of Making the Same."

This invention relates to die-formed sheet metal structures and method of making them, and has for an object the provision of improvements in this art.

Prior art composite structures are generally of the frame or body types. Frames are fabricated of preformed pieces. Body panels are fabricated by pressing a large uniform sheet of material; it has been proposed that two sheets of different thicknesses be joined and the composite sheet formed into a body panel. The former structure may be called a formed and welded structure and the latter structure may be called a welded and formed structure.

Formed and welded structures present problems of proper fitting and usually require complicated jig fixtures and much hand welding.

Welded and formed structures present problems of waste and create high stress concentration in the weld zone areas.

It would be desirable to form open shapes without the difficulty of welding formed shapes. It would also be desirable to fabricate open shapes without waste of sheet material. It would be further desirable to make some of the frame structural members of a composite body-frame structure of materials which are inherently stronger and/or rust resistant as well as of different sheet thicknesses.

One of the particular objects of the invention is to simplify sheet metal structures and methods of making them.

Another object is to eliminate doublers and the welding for attachment thereof to strengthen local areas.

Another object is to eliminate joints in zones of highest stress, as at geometrical junctions.

Another object is to eliminate waste of material.

Another object is to avail of the high strength and neat appearance of mash welds.

Another object is to provide greater accuracy of shape, making major components in a single set of dies.

Another object is to provide joining a number of small elements together in final assembly by making a large component as a composite single unit.

Another object is to join a number of parts into a single frame blank and form the entire component in a single die; especially to form the blank of a plurality of different gages of different or similar sheet metal.

Body frame structures constructed in accordance with the present invention may be made by cutting a plurality of different shaped flat sheets and arranging them into a composite open frame configuration having overlapping or butt joint edges, welding the edges while the sheets are in a flat plane and then die-forming the composite welded frame into a body-frame shape by a single die-forming operation.

The above and other objects and various advantages of the invention will be apparent from the following description of an exemplary embodiment, reference being made to the accompanying drawings wherein:

FIGS. 3 to 9 are sections taken respectively on the lines 3—3 to 9—9 of FIG. 2;

FIG. 10 is a section through the overlap of two metal sheets in preparation for joining them by a mash weld; and FIG. 11 is a section through the weld zone.

Figure 1:
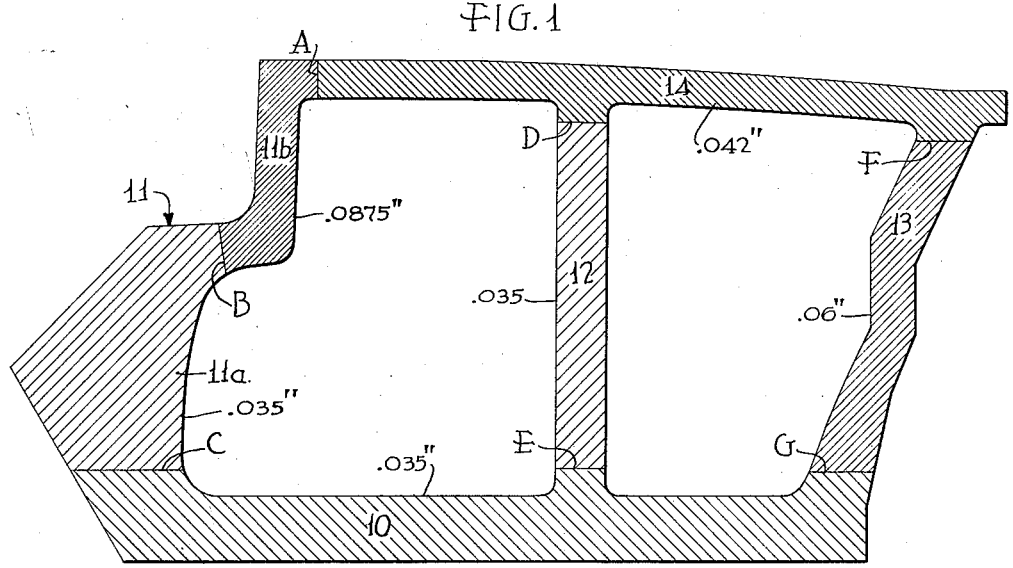
FIG. 1 is a plan view of a composite welded-up blank for forming a side panel for a four-door sedan, the portions of the blank being composed of different or similar metal sheets of different thicknesses.

In the preferred embodiment of the invention shown in the drawings, an automobile inner side panel for a four-door sedan is formed from an open-frame blank comprising a bottom sill or rail portion 10 formed of a single blank element, a front or A-post portion 11 formed of a lower blank element 11a and an upper blank element 11b, a middle or B-post portion 12 formed of a single blank element, a rear C-post portion 13 formed of a single blank element, and a top head rail portion 14 formed of a single blank element.

The elements are joined by welds, preferably mash welds, at the weld lines A, B, C, D, E, F and G. All of the weld lines are so located that they will extend across an element instead of being at the end or edge of an element after final formation.

To match the strength to local loadings and to avoid doublers the various elements are formed of sheets of different thicknesses, as an example the element 10 being of .035" stock, the element 11a being of .035" stock, the element 11b being of .0875" stock, the element 12 being of .035" stock, the element 13 being formed of .042" stock, and the element 14 being formed of .0598" or .06" stock. Metals of high strength alloy or rust resistant metal may be employed.

As shown in FIGS. 10 and 11 the mash welds squeeze down the overlapping edges to about the thickness of the thicker sheet at the joint and the joints after finishing cannot readily be located visually. The composite blank has been found to work very well in dies which have usual shape with provision to fit the different thicknesses.

An outer side panel is similarly formed as a composite blank by welding a plurality of parts together to form an open framework and stamped in a unitary die; after which the two panels are welded together, as by resistance spot welding in facing edge flanges to form the composite box-section side panel. It is not believed to be necessary to show the other side panel or the composite side panel, the showing of one side panel component illustrating the principles of fabrication.

When the side frame panels are made of welded-up units and formed as a single stamping there is a great saving of material and much more accurately dimensioned and formed parts are obtained than first forming and then welding. The roll-made mash welds are highly resistant to fatigue failure. In the arrangement shown the weld joints are located at a distance from the corners where stresses are concentrated and out along strips of the frame where the stresses are less concentrated. The weld lines are located at a distance from the areas of draw and in all cases are disposed across strips so that little or no draw occurs in the welds. The shaping or bending is across the length of the welds, which avoids the chance of pulling them apart in shear.

It is known that welding tends to anneal cold-drawn steels and the weld nugget is formed as cast metal which is difficult to die draw. With the joints located at a distance from the geometrical junction points the weld zone is not in an area of stress concentration, and the weld may be so located that it is not in the areas of deep drawing.

Figure 2:
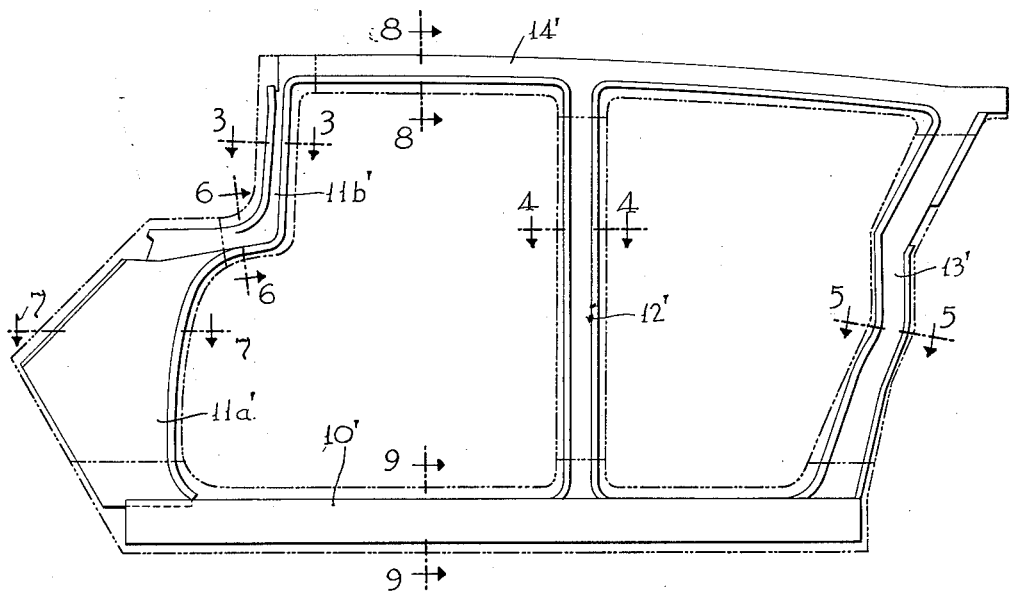
FIG. 2 is a plan view of the final stamping, the original blank size being indicated in exterior chain lines.

In FIG. 2 and in FIGS. 3 to 9 the reshaped sections are designated by the same reference characters as in FIG. 1 but with a prime (') added.

When the side panels are assembled in a car body and the doors are closed all of the weld lines are hidden from view from the exterior except those on the center pillar or B post, the welds D and E here. Only a small part of these welds is visible between doors when they are closed and, if desired, may be concealed by a light capping strip welded to or attached on the exterior of the post. When the doors are open a portion of the length of the other welds is visible but they are relatively smooth and present (when ground, of course) no more objectionable appearance than the details found here on most car constructions. Roll mash welds present a smoother appearance than arc or spot welds which are usually visible here, and avoid the necessity of expensive hand finishing of the weld joints.

The use of multiple gages or high strength alloys, which may be of similar gages, is particularly advantageous in that it avoids the use of doublers, as where the frame is formed of a single sheet of uniform thickness with the openings cut out; and avoids the inaccuracies in size and shape and the extra labor, as where the frame is formed of separate stampings welded together after formation. Far better welds can be formed with the metal in the flat than after formation. This is true regardless of whether flash, resistance or mash welding is employed. Besides, the labor and expense of manufacture are greatly reduced by the present method.

While one embodiment of the invention has been described for purposes of illustration it is to be understood that there may be various embodiments and modifications within the scope of the invention such as the employment of high strength stainless alloys and/or rust proof clad or galvanized metals.

What is claimed is:

1. The method of making a sheet metal side panel unit, which comprises, blanking a bottom sill element having stub upward projections at post locations, blanking a roof rail element having at least one downward stub projection at a post location, blanking a plurality of separate intermediate post elements, overlapping said elements in an open flat frame form, mash welding said post elements to said sill and rail elements at joints extending across the side parts of the frame at a distance from the geometrical junctions and simultaneously reducing the weld joint to about single element thickness, and including joints with said stub projections, to form a complete flat frame with sides and openings, and die-forming in mating dies the complete flat frame thus welded together from a plurality of individual side components.

2. The method as set forth in claim 1 in which said elements are of various sheet thicknesses.

3. The method as set forth in claim 2 in which at least two elements are of different types of sheet metal including plain steel and galvanized steel.

4. The method of making a frame-like metal structure having at least one relatively large interior opening completely surrounded by a plurality of frame side strips, at least one for each side, which comprises, cutting out separate parts from flat sheets and overlapping the edges to form the sides to general shape, mash welding the overlapping edges and simultaneously reducing the weld joint to about single sheet thickness whereby the parts form a uniform flat frame with an interior opening, and die-forming the composite flat frame-like sheet in mating dies as a single stamping.

5. The method as set forth in claim 4, further characterized by the fact that the composite frame-like sheet is formed from parts of different thicknesses welded together.

6. The method as set forth in claim 4, further characterized by the fact that the welds are made in lines which run across the frame side strips at a distance from the geometric junctions of the frame, whereby during the die-forming operation the metal at the weld lines is stretched principally along the length of the weld lines.

7. The method of making an automobile side panel unit having at least one large door opening which comprises, providing a plurality of flat strip elements of different size and thickness, at least one for each of the sides arranged to form overlapping side strips of a frame-shaped blank, mash welding and simultaneously reducing the weld joint to about single element thickness of the strip elements to form a flat frame-shaped composite blank, and die-forming the blank as a unit in mating dies to form the side panel unit.

8. The method as set forth in claim 7, further characterized by the fact that the elements are formed of metal sheets of different thicknesses and that the welded joints are located at a distance from the geometric junctions of the frame.

9. A die-formed sheet metal vehicle side panel unit, comprising in combination, a bottom sill element having upward projections for post locations, a roof rail element having at least one downward projection for a post location, post elements having overlapping mash welded joints with said projections and forming an integral press-formed frame, some of said elements having a thickness different from that of other elements.

10. A die-formed sheet metal vehicle side panel unit as set forth in claim 9, which is formed with two door openings and front, middle and rear posts, the front post being formed of metal of two different thicknesses and the top and bottom rails and rear post being formed of metal of different thicknesses.

11. The method of making a unit sideframe for automobiles comprising the steps of: blanking a plurality of plain steel components from flat sheet stock, blanking a plurality of galvanized steel components from flat sheet stock, arranging said components in an open frame pattern with overlapping component edges having joints of mating galvanized steel and plain steel, mash welding and simultaneously reducing the thickness of said overlapping edges to about single sheet thickness to form a uniform flat open unit sideframe, and die-forming with mating dies said uniform flat open unit sideframe by simultaneously draw-forming all said components and all said mash welded edges to make an outer sideframe.

12. The method as set forth in claim 11 which further includes the step of joining an inner sideframe to said outer sideframe by resistance spot welding said sideframes together to provide a hollow section unit sideframe.

13. A die-formed integral sheet metal side panel unit comprising in combination, a bottom sill element, a roof rail element, a plurality of post elements overlapping said bottom sill element and said roof rail element, welds joining said overlapping edges of said post elements to said rail and roof elements to form an integral unit, said welds being of a thickness approximating the thickness of the thicker element, and die-drawn shapes including facing edge flanges die-formed in said integral units for precision location of all die-drawn shapes relative to each other.

References Cited by the Examiner

UNITED STATES PATENTS

| | | | |
|---|---|---|---|
| 1,042,644 | 10/12 | Budd | 189—76 |
| 1,949,615 | 3/34 | Meinel | 113—116 |
| 2,389,907 | 11/45 | Helmuth | 296—28 |

FOREIGN PATENTS

| | | |
|---|---|---|
| 620,526 | 3/49 | Great Britain. |
| 350,245 | 6/31 | Great Britain. |

PHILIP ARNOLD, *Primary Examiner.*

A. HARRY LEVY, *Examiner.*